United States Patent
Sato et al.

(10) Patent No.: US 9,083,910 B2
(45) Date of Patent: Jul. 14, 2015

(54) DEVICE AND METHOD FOR DETERMINING COLOR OF OUTPUT IMAGE IN IMAGE FORMING APPARATUS

(71) Applicant: CANON KABUSHIKI KAISHA, Tokyo (JP)

(72) Inventors: Yoshikazu Sato, Kawasaki (JP); Daisuke Matsunaga, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/101,949

(22) Filed: Dec. 10, 2013

(65) Prior Publication Data

US 2014/0168675 A1   Jun. 19, 2014

(30) Foreign Application Priority Data

Dec. 18, 2012   (JP) .................................. 2012-275792

(51) Int. Cl.
H04N 1/60   (2006.01)
H04N 1/40   (2006.01)

(52) U.S. Cl.
CPC ...................................... H04N 1/40 (2013.01)

(58) Field of Classification Search
None
See application file for complete search history.

(56) References Cited

U.S. PATENT DOCUMENTS

| | | | |
|---|---|---|---|
| 5,861,960 A * | 1/1999 | Suzuki et al. | 382/239 |
| 6,118,552 A * | 9/2000 | Suzuki et al. | 382/166 |
| 6,773,176 B2 * | 8/2004 | Kurosawa | 400/76 |
| 7,006,247 B1 * | 2/2006 | Sekine et al. | 358/1.9 |
| 7,616,360 B2 | 11/2009 | Otake et al. | |
| 7,697,170 B2 * | 4/2010 | Otake et al. | 358/3.28 |
| 7,755,800 B2 * | 7/2010 | Malik et al. | 358/1.9 |
| 7,936,919 B2 * | 5/2011 | Kameyama | 382/167 |
| 7,990,589 B2 | 8/2011 | Otake et al. | |
| 8,077,348 B2 | 12/2011 | Sato et al. | |
| 8,189,212 B2 * | 5/2012 | Uchida et al. | 358/1.13 |
| 8,194,284 B2 * | 6/2012 | Cho | 358/2.1 |
| 8,355,168 B2 * | 1/2013 | Gotoh | 358/1.9 |
| 8,493,514 B2 * | 7/2013 | Choi et al. | 348/655 |
| 8,705,854 B2 * | 4/2014 | Kang | 382/166 |
| 2003/0202196 A1 * | 10/2003 | Ooki | 358/1.9 |
| 2007/0127056 A1 * | 6/2007 | Hirano et al. | 358/1.14 |
| 2009/0147287 A1 * | 6/2009 | Misawa | 358/1.9 |
| 2010/0046831 A1 * | 2/2010 | Kang | 382/166 |
| 2012/0026518 A1 * | 2/2012 | Nishizawa | 358/1.9 |
| 2013/0038762 A1 * | 2/2013 | Honda et al. | 348/246 |
| 2014/0126809 A1 * | 5/2014 | Matsumura et al. | 382/162 |
| 2014/0129399 A1 * | 5/2014 | Matsunaga et al. | 705/34 |

FOREIGN PATENT DOCUMENTS

JP   2012-032668 A   2/2012

* cited by examiner

*Primary Examiner* — Dung Tran

(74) *Attorney, Agent, or Firm* — Fitzpatrick, Cella, Harper & Scinto

(57) ABSTRACT

In a case where image processing, in which a ratio of the number of color pixels greatly fluctuates, is executed after performing charging determination, an output result might not match a result of the charging determination. There is provided a device for determining a color of an output image in a case where an image to be printed is printed with an additional image attached thereto, the device including: a unit configured to divide the image to be printed into blocks of a predetermined size; a unit configured to calculate an average value of color components of pixels included in the block; a correction value calculation unit configured to correct a calculated average value using a correction value corresponding to the additional image; and a color/monochrome determination processing unit configured to determine, based on the corrected average value, whether the block is a color block or a monochrome block.

10 Claims, 14 Drawing Sheets

BLOCK HEADER [ 63:0 ]

| bit0 | bit8 | bit16 | bit24 bit31 |
|---|---|---|---|
| BLOCK X COORDINATE | BLOCK Y COORDINATE | THUMBNAIL VALUE 0 | THUMBNAIL VALUE 1 |

| bit32 | bit40 | bit48 | bit52 | bit56 bit63 |
|---|---|---|---|---|
| THUMBNAIL VALUE 2 | THUMBNAIL VALUE 3 | COLOR SPACE | COMPRESSION FORM | ALL ZERO DATA |

FIG.4

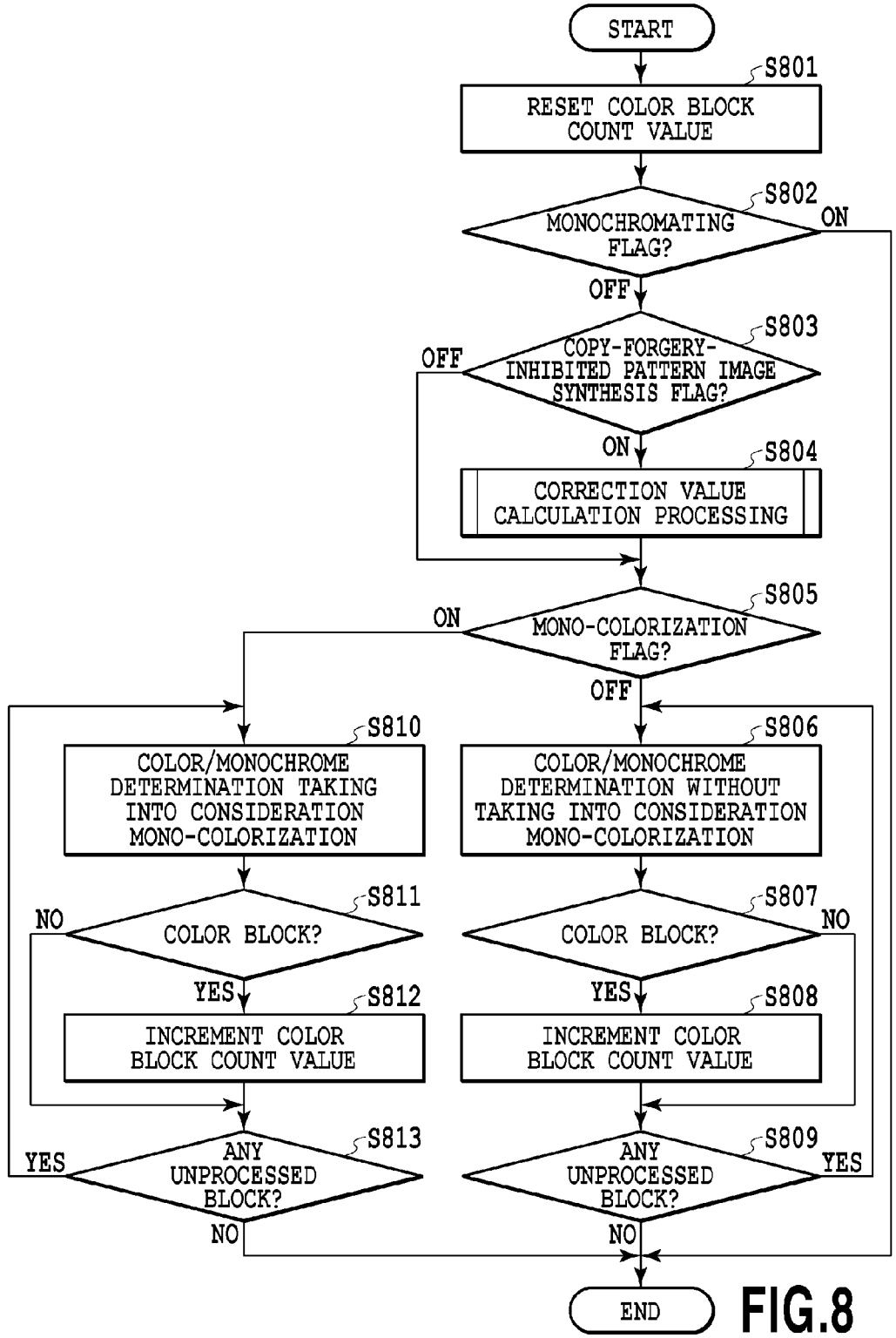

| LATENT IMAGE ID | LATENT-IMAGE COPY-FORGERY-INHIBITED PATTERN | COPY-FORGERY-INHIBITED PATTERN COLOR | LATENT IMAGE SIZE | CORRECTION VALUE FOR LATENT IMAGE COPY-FORGERY-INHIBITED PATTERN (BLOCK COORDINATE X, BLOCK COORDINATE Y, Y, U, V) |
|---|---|---|---|---|
| 0 | CONFIDENTIAL | RED | 36 | {30n,8m,35,110,180},{30n+1,8m,40,120,180},... |
| 1 | COPY INHIBIT | RED | 36 | {50n,8m,25,120,165},{50n+1,8m,28,100,160},... |
| 2 | FOR INTERNAL USE ONLY | RED | 36 | {60n,8m,28,100,160},{60n+1,8m,28,100,160},... |
| 3 | COPY | RED | 36 | {35n,8m,35,120,150},{35n+1,8m,30,110,170},... |
| ... | ... | ... | ... | ... |
| 14 | COPY | RED | 12 | {250n,130m,28,100,160},{250n+1,130m,28,106,165},... |
| ... | ... | ... | ... | ... |

※ n AND m ARE POSITIVE INTEGERS

FIG.9A

| BACKGROUND ID | BACKGROUND COPY-FORGERY-INHIBITED PATTERN | COPY-FORGERY-INHIBITED PATTERN COLOR | CORRECTION VALUE FOR BACKGROUND COPY-FORGERY-INHIBITED PATTERN (BLOCK COORDINATE X, BLOCK COORDINATE Y, Y, U, V) |
|---|---|---|---|
| 0 | WITHOUT BACKGROUND | RED | {10n,10m,20,115,170},{10n+1,10m,30,110,170},... |
| 1 | CHERRY BLOSSOM | RED | {6n,4m,28,120,130},{6n+1,4m,28,100,160},... |
| 2 | CLOUD | RED | {6n,4m,32,125,155},{6n+1,4m,32,115,175},... |
| 3 | WAVE | RED | {6n,4m,30,130,150},{6n+1,4m,30,110,170},... |
| ... | ... | ... | ... |

※ n AND m ARE POSITIVE INTEGERS

FIG.9B

| LATENT IMAGE ID | BACKGROUND ID | COLOR IMAGE FLAG |
|---|---|---|
| 0 | 0 | FULL AREA COLOR |
| 1 | 0 | FULL AREA COLOR |
| 2 | 0 | FULL AREA COLOR |
| 3 | 0 | FULL AREA COLOR |
| ⋮ | ⋮ | ⋮ |
| 14 | 1 | FULL COLOR |
| ⋮ | ⋮ | ⋮ |
| 3 | 2 | FULL AREA COLOR |
| ⋮ | ⋮ | ⋮ |

FIG.11

DEVICE AND METHOD FOR DETERMINING COLOR OF OUTPUT IMAGE IN IMAGE FORMING APPARATUS

BACKGROUND OF THE INVENTION

1. Field of the Invention

The present invention relates to techniques for determining a charging class of image data handled in a color printing apparatus and a color printing system.

2. Description of the Related Art

Japanese Patent Laid-Open No. 2012-32668 discloses a technique for generating a reduced image (hereinafter, referred to as a "thumbnail image") from an image to be printed, and determining, based on whether each pixel of a generated thumbnail image is a color pixel or a black-and-white pixel, a charging amount required for printing the image to be printed. In the technique of Japanese Patent Laid-Open No. 2012-32668, the speed of charging class determination processing is increased by utilizing a thumbnail image.

For example, an image, such as a stamp image or a copy-forgery-inhibited pattern image, (hereinafter, referred to as an "additional image") may be combined with an image to be printed, but the technique of the Japanese Patent Laid-Open No. 2012-32668 described above does not take into consideration such a case. That is, the method of Japanese Patent Laid-Open No. 2012-32668, in which color/monochrome determination is performed based only on a thumbnail image generated from an image to be printed, may result in an inappropriate charging amount. For example, in a case where after performing the charging determination, image processing that causes a ratio of the number of color pixels to greatly fluctuate is executed; an output result might not match a result of the charging determination.

SUMMARY OF THE INVENTION

A device according to the present invention is the one for determining the color of an output image in a case where an image to be printed is printed with an additional image attached thereto, the device including: a unit configured to divide the image to be printed into blocks of a predetermined size; a unit configured to calculate an average value of a color components of pixels included in the block; a correction value calculation unit configured to correct a calculated average value using a correction value corresponding to the additional image; and a color/monochrome determination processing unit configured to determine, based on the corrected average value, whether the block is a color block or a monochrome block.

The present invention allows for color/monochrome determination of a printed material (output image) consistent with a print result, so that an appropriate charging amount can be determined.

Further features of the present invention will become apparent from the following description of exemplary embodiments (with reference to the attached drawings).

BRIEF DESCRIPTION OF THE DRAWINGS

FIG. 4 is a view showing an example of a block header;

FIG. 8 is a flow chart showing a detail of color/monochrome determination processing;

FIGS. 9A and 9B are views showing an example of a correction value table;

FIG. 11 shows an example of a color image flag determination table;

DESCRIPTION OF THE EMBODIMENTS

Hereinafter, the best mode for implementing the present invention will be described with reference to the accompanying drawings.

First Embodiment

Figure 1:
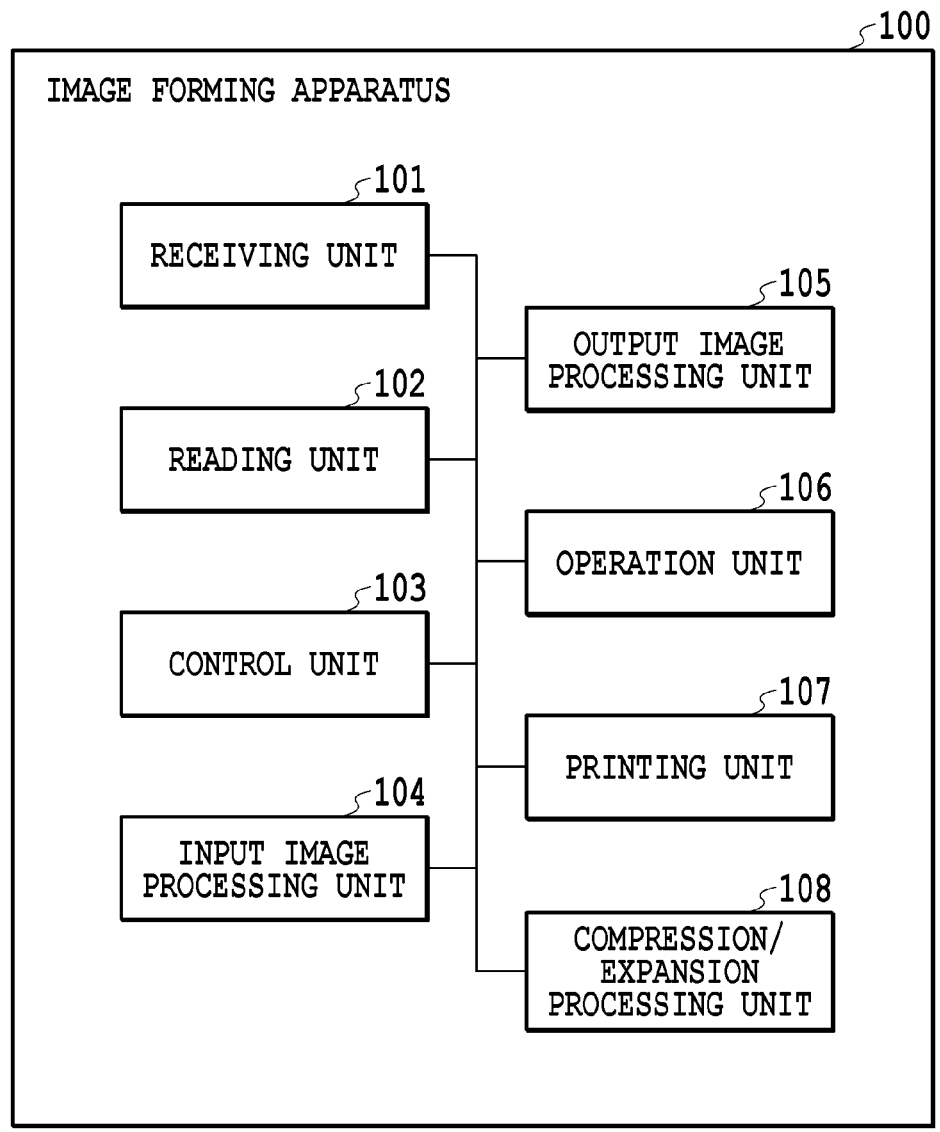
FIG. 1 is a block diagram showing an example of the configuration of an image forming apparatus according to the present embodiment.

FIG. 1 is a block diagram showing an example of the configuration of an image forming apparatus 100 according to a first embodiment.

A receiving unit 101 includes a well-known communication interface, and receives a print command from an external device, such as a non-illustrated PC connected via a network.

A reading unit 102 reads information printed on a recording medium, such as a paper, by an optical sensor to obtain the same as image data.

A control unit 103 includes non-illustrated CPU, RAM, ROM, and HDD, comprehensively controls each unit constituting the image forming apparatus 100 and performs various types of image processing by the CPU deploying a program, which is stored in the ROM or HDD, to the RAM and executing the same. Moreover, the control unit 103 performs processing for storing image data, which is input from the receiving unit 101 or the reading unit 102, into the HDD, and processing for outputting (printing) image data in response to an instruction from a user. Instructions to store and output the image data are accepted via an operation unit 106 or driver software.

An input image processing unit 104 performs predetermined image processing, for example such as shading correction processing or MTF correction processing, with respect to the image data that is obtained by the reading unit 102.

An output-image processing unit 105 performs predetermined image processing, for example such as rasterization processing, monochromating processing, mono-colorization processing, additional-image synthesis processing, halftone processing, with respect to the image data that is processed by the input image processing unit 104. Here, the rasterization processing is the one for coupling blocks in a page to generate a piece of image data (hereinafter, referred to as a "raster image"). The monochromating processing is the one for enabling to form an image using a single black color. The mono-colorization processing is colorization processing for forming an image using a single color (except black), such as cyan, magenta, or yellow. The additional-image synthesis processing is the one for combining an additional image, such as the above-described stamp image or copy-forgery-inhibited pattern image, with an image to be printed. In the present embodiment, a case shall be described, where a copy-forgery-inhibited pattern image is combined. Note that, the copy-forgery-inhibited pattern image includes a background copy-forgery-inhibited pattern and a latent-image copy-forgery-inhibited pattern, and is used to prevent illegal copy by causing the latent-image copy-forgery-inhibited pattern to emerge at the time of making a secondary copy.

The operation unit 106 is a user interface including a touch panel and a keyboard.

A printing unit 107 is a print engine, which may use ink or may use toner. The printing unit 107 may be any engine as long as it is capable of forming an image on a recording medium, such as paper.

A compression/expansion processing unit 108 compresses and expands image data. The compression scheme includes, for example, irreversible compression processing, such as JPEG, and reversible compression processing, such as JPEG-LS (Lossless), for example.

Figure 2:
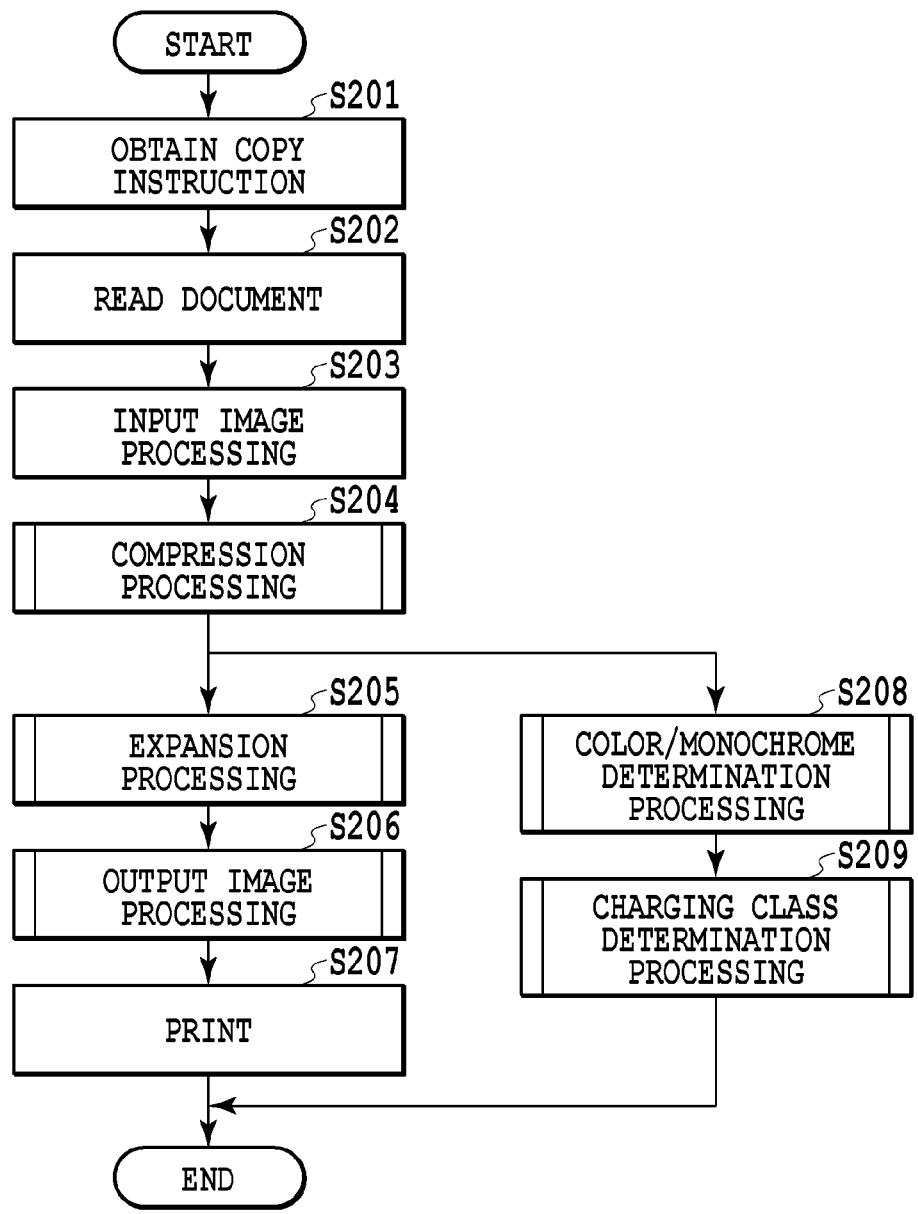
FIG. 2 is a flow chart showing a processing flow in performing a copy operation by the image forming apparatus.

FIG. 2 is a flow chart showing a processing flow in performing a copy operation by the image forming apparatus 100. Note that, these series of processing are performed by reading a computer-executable program, in which a procedure shown hereinafter is described, from the HDD or the like onto the RAM and then executing this program by the CPU.

In Step 201, the control unit 103 accepts copy instructions which a user inputs via the operation unit 106. The copy instructions here include various detailed settings to execute copying, specifically the settings of ON/OFF of the monochromating processing, ON/OFF of the mono-colorization processing, ON/OFF of the copy-forgery-inhibited pattern image synthesis processing, and so on. For example, in a case where a user has set the monochromating processing to ON, a monochromating flag is set to ON by the control unit 103. Similarly, a mono-colorization flag or a copy-forgery-inhibited pattern image synthesis flag is also set in accordance with contents which a user has set. Then, for example, a user who has set the mono-colorization processing to ON also sets a color used in the mono-colorization processing. In this case, the control unit 103 overwrites held mono-colorization color data with set color information. In a case where the mono-colorization color data is 4-bit data, a specific numerical value is assigned depending on a color, e.g., 0001 to cyan and 0010 to magenta. Moreover, a user, who has set the copy-forgery-inhibited pattern image synthesis to ON also sets the content, size, color of a latent-image copy-forgery-inhibited pattern constituting a copy-forgery-inhibited pattern image to add, and further sets also the content and color of a background copy-forgery-inhibited pattern. In this case, the control unit 103 manages the various kinds of set contents of a latent-image copy-forgery-inhibited pattern or a background copy-forgery-inhibited pattern as copy-forgery-inhibited pattern image user-setting data.

Note that the monochromating processing and the mono-colorization processing are exclusive from each other. For example, in a case where a user has set the mono-colorization processing to ON, the control unit 103 prevents the setting of the monochromating processing from being accepted, for example, by not displaying a setting screen of the monochromating processing. Moreover, the setting of a copy-forgery-inhibited pattern color needs to be matched between the monochromating processing and the mono-colorization processing, and the copy-forgery-inhibited pattern image synthesis processing. For example, in a case where a user has set the monochromating processing to ON, the control unit 103 forcibly sets a color used in the copy-forgery-inhibited pattern image synthesis processing to black, and displays as such also on a user interface.

In Step 202, the control unit 103 sends read start instructions to the reading unit 102. The reading unit 102 having received the read start instructions reads a document with an optical sensor, and generates image data of an RGB color space. The generated image data is sent to the input image processing unit 104. Note that, this flow chart describes the processing flow of a copy operation and therefore the image data of an RGB color space is generated by the reading unit 102. In a case of a print operation based on a print command from an external information terminal, such as a PC, the image data of an RGB color space or the image data of a CMYK color space will be generated by the control unit 103 based on the received print command. In this case, the generated image data is sent to the compression/expansion processing unit 108, not to the input image processing unit 104.

In Step 203, the input image processing unit 104 executes image processing, such as shading correction processing and MTF correction processing, on the image data received from the reading unit 102. The image data subjected to such image processing is sent to the compression/expansion processing unit 108.

In Step 204, the compression/expansion processing unit 108 executes predetermined compression processing on the image data received from the input image processing unit 104. The reason why data is compressed is that a RAM capacity of the control unit 103 is efficiently utilized. For example, in a case where irreversible compression is executed on an image having an area equal in size between a character region and a photograph region, a compression ratio (a size of a compressed image relative to a size of an original image) becomes approximately ⅒. On the other hand, in a case of reversible compression, the compression ratio becomes approximately ½. Needless to say, the compression ratio depends significantly on the content of an image.

Figure 3:
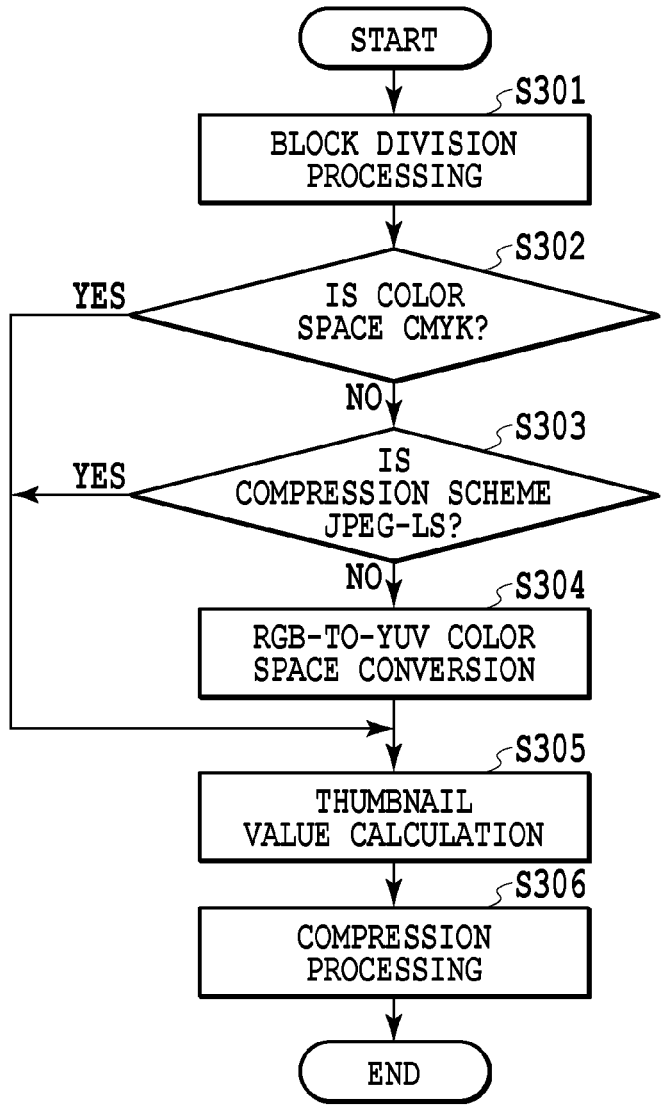
FIG. 3 is a flow chart showing a detail of compression processing.

FIG. 3 is a flow chart showing a detail of the compression processing. Hereinafter, the flow chart is described in detail.

In Step 301, the compression/expansion processing unit 108 divides received image data into blocks of a predetermined size, and further generates a block header indicative of the characteristic of each block. There is no specific restriction on the size of a block, and any size may be used. In the present embodiment, a block of eight-pixel square is used. FIG. 4 is a view showing an example of the block header, which includes 8 bytes. In FIG. 4, both "block X coordinate" and "block Y coordinate" are one-byte data, and are calculated and stored in division into blocks. "Thumbnail_value_0" to "thumbnail_value_3" are each one byte data, in which a value calculated in Step 305 to be described later is stored (see the description of Step 305 for details). At the start of processing, 0000 is given as an initial value. "Color space" is 4-bit data, in which a specific value, e.g., 0001 for 8-bit RGB and 0010 for 8-bit CMYK, corresponding to a color space expressing the color of each block is stored. "Compression format" is 4-bit data, in which a specific value, e.g., 0001 for JPEG and 0010 for JPEG-LS, corresponding to a compression format for identifying "what kind of format each block is compressed in" is stored. In the present embodiment, based on the type of a document specified by a user via the operation unit 106, "which compression format is used for each block" shall be determined. For example, in a case where a specified document is a photograph document, then JPEG is used, and in a case where a specified document is a text document, then JPEG-LS is used, and so on.

In Step 302, the compression/expansion processing unit 108 determines, with reference to the above-described "color space" in a block header, whether or not the color space of each divided block is CMYK. In a case where the color space is CMYK, the flow proceeds to Step 305. On the other hand, in a case where the color space is not CMYK, the flow proceeds to Step 303.

In Step 303, the compression/expansion processing unit 108 determines, with reference to the above-described "compression format" in a block header, whether or not the compression format is JPEG-LS. In a case where the compression format is JPEG-LS, the flow proceeds to Step 305. On the other hand, in a case where the compression format is not JPEG-LS, the flow proceeds to Step 304.

In Step 304, the compression/expansion processing unit 108 executes color space conversion from RGB to YUV on each block divided in Step 301. This conversion is executed using Formula (1) below, for example. Y=0.299R+0.587G+0.114B $$U=-0.169R-0.331G+0.500B+128$$

$$V=0.500R-0.419G-0.081B+128 \qquad \text{Formula (1)}$$

At the same time, the compression/expansion processing unit 108 updates the content of the above-described "color space" of a block header to YUV.

In Step 305, the compression/expansion processing unit 108 calculates the thumbnail value of each block. The calculated thumbnail value is stored into the above-described "thumbnail_value_0" to "thumbnail_value_3" of a block header. Here, the thumbnail value means an average value of each color component of pixels constituting a block. For example, assume that the color space of a block is YUV (the dynamic range of each component is assumed to be 0 to 255), and that a total value of each color component of a total of 64 pixels constituting a block of eight-pixel square is Y=5100, U=3100, and V=10400, respectively. The thumbnail value of the block in this case is Y=79, U=48, and V=162. Then, the compression/expansion processing unit 108 stores "79" into the thumbnail_value_0 of a block header, "48" into the thumbnail_value_1, and "162" into the thumbnail_value_2. Because YUV has three components, the thumbnail_value_3 remains as the initial value 0. For example, in a case of CMYK, an average value of a color component will be stored also into the thumbnail_value_3. Note that, the thumbnail value calculation method in this step is the same also in a RGB color space or in a CMYK color space and therefore an average value of each color component of a pixel constituting a block may be calculated.

In Step 306, the compression/expansion processing unit 108 executes compression processing in accordance with the compression format specified in the above-described "compression format" of a block header. The compressed block (hereinafter, referred to as a "compression block") is stored into the RAM.

The above is the content of the compression processing in Step 204.

Now, back to the description of the flow chart of FIG. 2.

After completing the compression processing, the processing in Step 205 to Step 207 and the processing in Step 208 to Step 209 are executed in parallel. Accordingly, depending on a condition, charging class determination processing relating to Step 209 may be executed prior to the output-image processing relating to Step 206. First, the processing related to the printing of Step 205 to Step 207 is described.

In Step 205, the compression/expansion processing unit 108 reads a compression block stored in the RAM, and executes predetermined expansion processing on the compression block.

Figure 5:
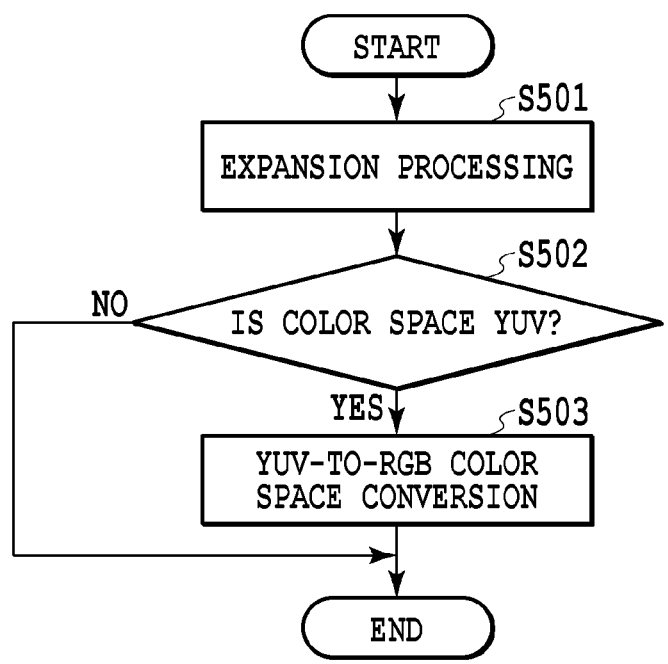
FIG. 5 is a flowchart showing a detail of expansion processing.

FIG. 5 is a flow chart showing a detail of the expansion processing.

In Step 501, the compression/expansion processing unit 108 executes expansion processing corresponding to a compression format, which is specified in the above-described "compression format" of a block header, on the compression block read from the RAM.

In Step 502, the compression/expansion processing unit 108 determines, with reference to the above-described "color space" of a block header, whether or not a color space of a block subjected to the expansion processing (hereinafter, referred to as an "expansion block") is YUV. In a case where the color space is YUV, the flow 108 proceeds to Step 503. On the other hand, in a case where the color space is not YUV, the data of the expansion block is sent to the output-image processing unit 105, and this processing is exited.

In Step 503, the compression/expansion processing unit 108 executes color space conversion from YUV to RGB on the expansion block. This conversion is executed using Formula (2) below, for example.

$$R=Y+1.371(V-128)$$

$$G=Y-0.336(U-128)-0.698(V-128)$$

$$B=Y+1.732(U-128) \qquad \text{Formula (2)}$$

At the same time, the compression/expansion processing unit 108 updates the content of the above-described "color space" of a block header to RGB. The data of the expansion block subjected to the color conversion is sent to the output-image processing unit 105.

The above is the content of the expansion processing in Step 205.

Now, back to the description of the flow chart of FIG. 2.

In Step 206, the output-image processing unit 105 executes output-image processing shown below on the expansion block received from the compression/expansion processing unit 108.

Figure 6:
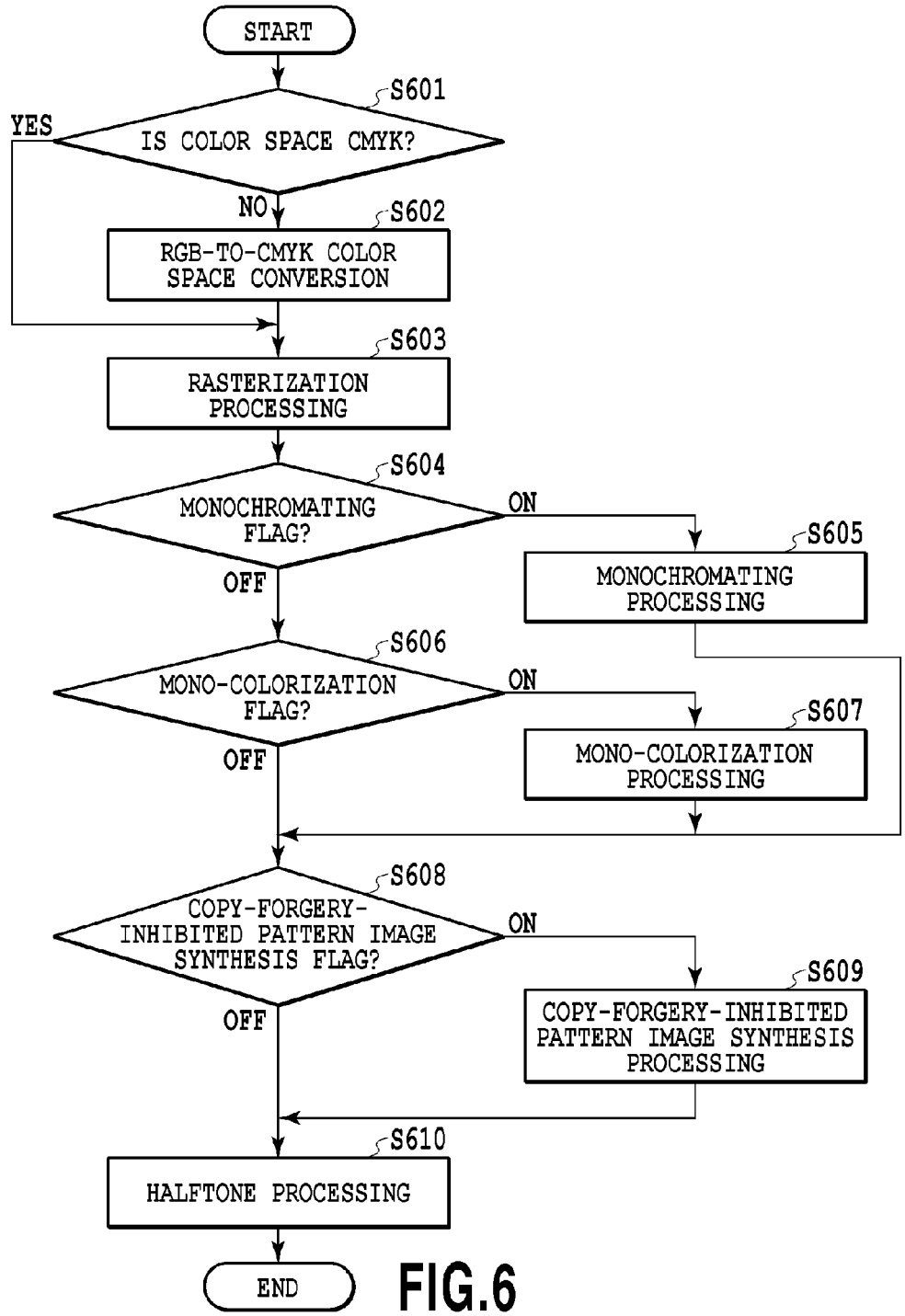
FIG. 6 is a flow chart showing a detail of output image processing.

FIG. 6 is a flow chart showing a detail of the output image processing.

In Step 601, the output-image processing unit 105 determines, with reference to the above-described "color space" of a block header, whether or not the color space of the expansion block is CMYK. In a case where the color space is CMYK, the flow proceeds to Step 603. On the other hand, in a case where the color space is not CMYK, the flow proceeds to Step 602.

In Step 602, the output-image processing unit 105 performs color space conversion from RGB to CMYK on the expansion block. This conversion is performed using a three-dimensional LUT (Look-Up Table) taking into consideration the device characteristics of the printing unit 107.

In Step 603, the output-image processing unit 105 couples the expansion blocks to generate a raster image. Note that, at this point, the block header becomes unnecessary and is therefore discarded.

In Step 604, the output-image processing unit 105 determines whether or not the above-described monochromating flag is ON. In the case of the present embodiment, simultaneously with the start of execution of copying, a value indicative of ON or OFF set in the monochromating flag is reflected on a monochromating flag register in the output-image processing unit 105. The output-image processing unit 105 determines, with reference to the content reflected on this monochromating flag register, whether or not the monochromating flag is ON. In a case where it is determined that the monochromating flag is ON, the flow proceeds to Step 605. On the other hand, in a case where it is determined that the monochromating flag is OFF, the flow proceeds to Step 606.

In Step 605, the output-image processing unit 105 performs the monochromating processing on the raster image generated in Step 603. The monochromating processing is realized by converting CMYK to ND data using a four-dimensional look-up table and then setting the color component of CMY to zero. Note that the ND data is data in which the same value (lightness value) is put in four color components of CMYK.

In Step 606, the output-image processing unit 105 determines whether or not the above-described mono-colorization flag is ON. In the case of the present embodiment, simultaneously with the start of execution of copying, a value indicative of ON or OFF set in the mono-colorization flag and a value of mono-colorization color data are reflected on a mono-colorization flag register in the output-image processing unit 105. The output-image processing unit 105 determines, with reference to a content reflected on this mono-colorization flag register, whether or not the mono-colorization flag is ON. In a case where it is determined that the mono-colorization flag is ON, the flow proceeds to Step 607. On the other hand, in a case where it is determined that the mono-colorization flag is OFF, the flow proceeds to Step 608.

In Step 607, the output-image processing unit 105 performs the mono-colorization processing on the raster image generated in Step 603. The mono-colorization processing is realized by converting CMYK to ND data using the four-dimensional look-up table and then setting color components except a color component indicated by the mono-colorization-color-data register, to zero.

In Step 608, the output-image processing unit 105 determines whether or not the copy-forgery-inhibited pattern image synthesis flag described above is ON. In the case of the present embodiment, simultaneously with the start of execution of copying, a value indicative of ON or OFF set in the copy-forgery-inhibited pattern image synthesis flag and a content of the copy-forgery-inhibited pattern image user-setting data are reflected on a copy-forgery-inhibited pattern image synthesis flag register and a copy-forgery-inhibited pattern image user-setting data register in the output-image processing unit 105. The output-image processing unit 105 determines, with reference to the content reflected on the copy-forgery-inhibited pattern image synthesis flag register, whether or not the copy-forgery-inhibited pattern image synthesis flag is ON.

Figure 7:
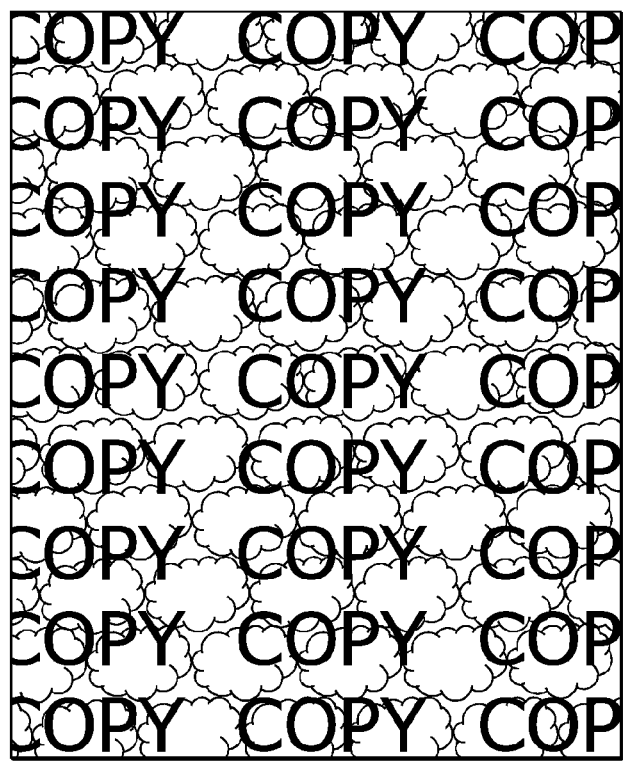
FIG. 7 is a view showing an example of a copy-forgery-inhibited pattern image.

Here, the copy-forgery-inhibited pattern image user-setting data is described. The copy-forgery-inhibited pattern image user-setting data includes four components, i.e., a latent-image copy-forgery-inhibited pattern, a background copy-forgery-inhibited pattern, a copy-forgery-inhibited pattern color, and a latent image size. FIG. 7 is a view showing an example of the copy-forgery-inhibited pattern image, and in a case of the copy-forgery-inhibited pattern image user-setting data corresponding to this copy-forgery-inhibited pattern image, each data is stored, such as that a character of "COPY" is stored into the latent-image copy-forgery-inhibited pattern, a figure of "cloud" into the background copy-forgery-inhibited pattern, "RED" into the copy-forgery-inhibited pattern color, and "36" into the latent image size.

In a case where it is determined in this step that the copy-forgery-inhibited pattern image synthesis flag is ON, the flow proceeds to Step 609. On the other hand, in a case where it is determined that the copy-forgery-inhibited pattern image synthesis flag is OFF, the flow proceeds to Step 610.

In Step 609, the output-image processing unit 105 performs the copy-forgery-inhibited pattern image synthesis processing on the raster image generated in Step 603. Specifically, with reference to the copy-forgery-inhibited pattern image user-setting data register described above, the output-image processing unit 105 performs the processing for combining a copy-forgery-inhibited pattern image corresponding to the content, size, and color of a latent-image copy-forgery-inhibited pattern and also the content and color of a background copy-forgery-inhibited pattern that are specified by a user, with a raster image (image to be printed).

In Step 610, the output-image processing unit 105 performs, in accordance with each flag, the halftone processing on the raster image subjected to the monochromating processing, the mono-colorization processing, and the copy-forgery-inhibited pattern image synthesis processing. For the halftone processing, a well-known technique, such as a dither method or an error diffusion method, is used. The data of the raster image subjected to the halftone processing is sent to the printing unit 107.

The above is the content of the output-image processing in Step 206.

Now, back to the description of the flow chart of FIG. 2.

In Step 207, the printing unit 107 executes printing based on the raster image data received from the output-image processing unit 105. Then, a printed material is output from a non-illustrated paper discharge unit.

Next, processing related to the determination of the charging class of Step 208 to Step 209 is described.

In Step 208, the control unit 103 performs the color/monochrome determination processing on a compression block stored in the RAM.

FIG. 8 is a flow chart showing a detail of the color/monochrome determination processing.

In Step 801, the control unit 103 sets to zero (resets) the value of a count value (hereinafter, referred to as a "color block count value") for accumulating the number of the color blocks used in charging class determination processing to be described later.

In Step 802, the control unit 103 determines whether or not the above-described monochromating flag is ON. In a case where it is determined that the monochromating flag is ON, this processing is exited. In this case, the color block count value remains zero and therefore in charging class determination processing (Step 209) to be described later, the charging class will be determined as the monochrome image charging. On the other hand, in a case where it is determined that the monochromating flag is OFF, the flow proceeds to Step 803.

In Step 803, the control unit 103 determines whether or not the copy-forgery-inhibited pattern image synthesis flag described above is ON. In a case where it is determined that the copy-forgery-inhibited pattern image synthesis flag is ON, the flow proceeds to Step 804. On the other hand, in a case where it is determined that the copy-forgery-inhibited pattern image synthesis flag is OFF, the flow proceeds to Step 805.

In Step 804, the control unit 103 executes correction value calculation processing. Prior to describing the detail of the correction value calculation processing, a correction value table is described.

FIGS. 9A and 9B are views showing an example of the correction value table. In the present embodiment, the correction value table of a YUV color space is described as an example, but also for the RGB color space and the CMYK color space, a similar correction value table is used except that the color space differs. FIG. 9A shows a correction value table for latent-image copy-forgery-inhibited pattern and FIG. 9B shows a correction value table for background copy-forgery-inhibited pattern. The correction value table for latent-image copy-forgery-inhibited pattern and the correction value table for background copy-forgery-inhibited pattern are separately managed. In the correction value table for latent-image copy-forgery-inhibited pattern, a latent-image copy-forgery-inhibited pattern, a copy-forgery-inhibited pattern color, a latent image size, and a correction value for latent-image copy-forgery-inhibited pattern are associated with each other for each latent image ID (a serial number starting from zero). Then, in each correction value for latent-image copy-forgery-inhibited pattern, a block coordinate X, a block coordinate Y, a Y value, a U value, and a V value are stored. Similarly, also in the correction value table for background copy-forgery-inhibited pattern, a background copy-forgery-inhibited pattern, a copy-forgery-inhibited pattern color, and a correction value for background copy-forgery-inhibited pattern are associated with each other for each background ID, and the block coordinate X, the block coordinate Y, the Y value, the U value, and the V value are stored.

Note that, the block coordinate X and the block coordinate Y in the correction value for latent-image copy-forgery-inhibited pattern and in the correction value for the background copy-forgery-inhibited pattern are normalized. Here, n and m are positive integers. This correction value table utilizes the fact that a copy-forgery-inhibited pattern image is printed in a repeated pattern. A minimal number of correction values are prepared in advance, and for the portion of the repeated pattern, correction value calculation can be realized in a case where a coordinate is multiplied by a positive integer and a correction value is applied. Thus, the number of correction values to prepare can be reduced. Furthermore, each correction value is prepared only for the block coordinates at which a copy-forgery-inhibited pattern image is added. That is, for the block coordinates at which a copy-forgery-inhibited pattern image is not added, there is no need to make correction and therefore a correction value is not prepared. This can further reduce the number of correction values to prepare.

Figure 10:
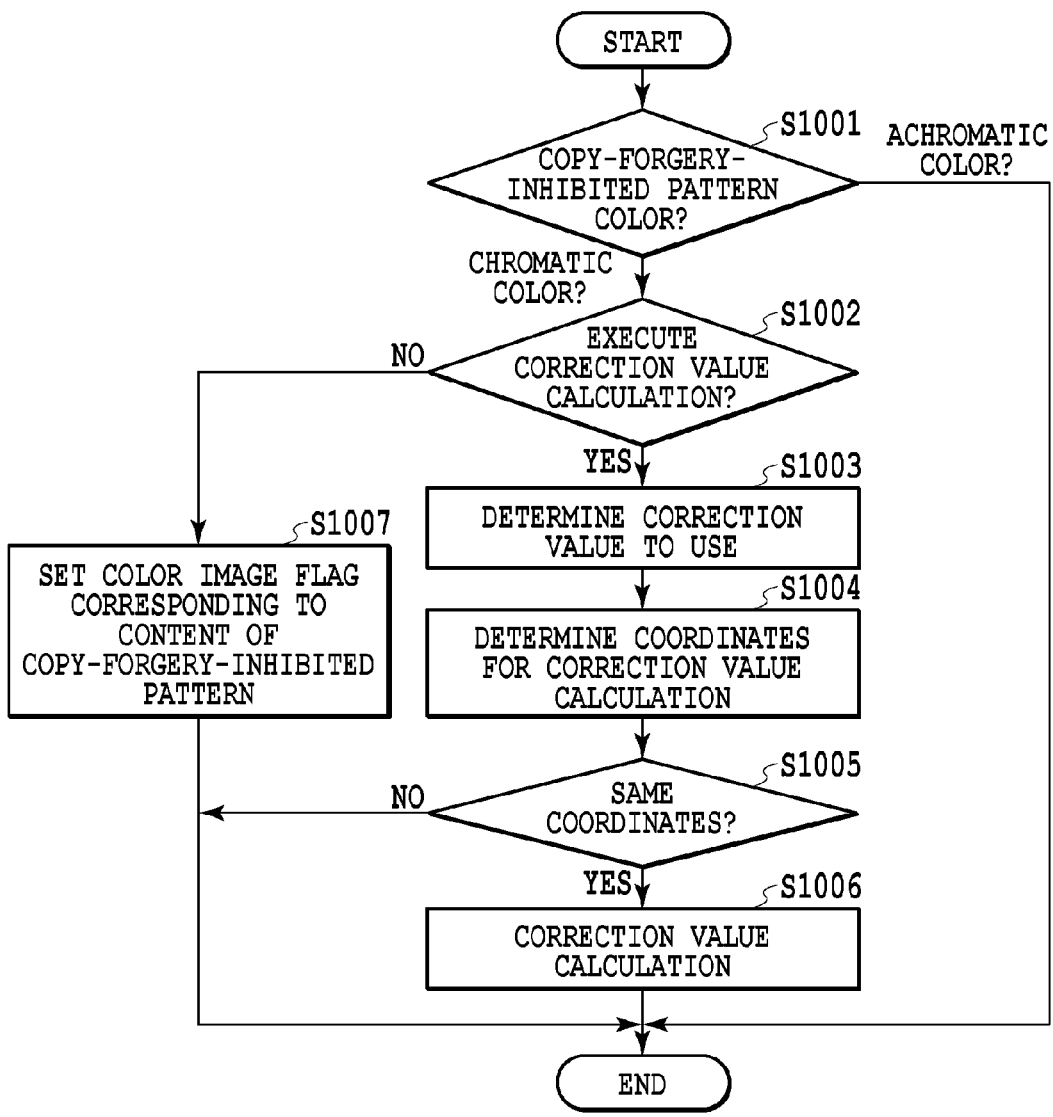
FIG. 10 is a flowchart showing a detail of correction value calculation processing.

Next, the correction value calculation processing is described. FIG. 10 is a flow chart showing a detail of the correction value calculation processing.

In Step 1001, the control unit 103 determines, with reference to the copy-forgery-inhibited pattern image user-setting data, whether the copy-forgery-inhibited pattern color is a achromatic color or a chromatic color. In a case where it is determined that the copy-forgery-inhibited pattern color is a chromatic color, the flow proceeds to Step 1002. On the other hand, in a case where it is determined that the copy-forgery-inhibited pattern color is an achromatic color (in a case where a copy-forgery-inhibited pattern image to be added is gray or black), there is no influence on the color/monochrome determination and therefore the correction value calculation does not need to be performed. Therefore, this processing is exited.

In Step 1002, the control unit 103 determines whether or not to execute the correction value calculation. This determination is performed based on the correction value calculation determination flag, which is set by an authorized person, such as a serviceman or an administrator at the time of installation, maintenance, or the like of the image forming apparatus 100. In a case where the performance of the color/monochrome determination processing is desired to be prioritized at the time of setting the correction value calculation determination flag, a flag indicative of not performing the correction value calculation is set. Thus, based only on the content of a copy-forgery-inhibited pattern image, "which one of monochromatic/full_color/full_area_color the copy-forgery-inhibited pattern image to be added corresponds to" will be determined. On the other hand, in a case where the color/monochrome determination processing is desired to be performed with a higher degree of accuracy, a flag indicative of performing the correction value calculation is set. Thus, based on both the contents of a copy-forgery-inhibited pattern image to be added and an image to be printed, "which one of monochromatic/full color/full area color the copy-forgery-inhibited pattern image to be added corresponds to" will be determined. In a case where it is determined by the correction value calculation determination flag that the correction value calculation is performed, the flow proceeds to Step 1003. On the other hand, in a case where it is determined by the correction value calculation determination flag that the correction value calculation will not be performed, the flow proceeds to Step 1007.

In Step 1003, the control unit 103 determines, with reference to the copy-forgery-inhibited pattern image user-setting data, a correction value used for the correction value calculation. For example, in a case of the copy-forgery-inhibited pattern image user-setting data corresponding to the copy-forgery-inhibited pattern image of FIG. 7 described above, a correction value for latent-image copy-forgery-inhibited pattern of the latent image ID of "3" in FIG. 9A and a correction value for background copy-forgery-inhibited pattern of the background ID of "2" in FIG. 9B are determined as the correction values to use.

In Step 1004, the control unit 103 reads the block X coordinate data and block Y coordinate data in the block header, and determines the coordinates for correction value calculation.

In Step 1005, the control unit 103 compares the determined coordinates for correction value calculation with the block coordinates in the correction value for latent-image copy-forgery-inhibited pattern and the correction value for background copy-forgery-inhibited pattern that were determined in Step 1003, and determines whether or not there are the same coordinates. In a case where it is determined that there are the same coordinates, the flow proceeds to Step 1006. On the other hand, in a case where it is determined that there are no same coordinates, this processing is exited.

In Step 1006, the control unit 103 performs the correction value calculation. Specifically, correction using a correction value for latent-image copy-forgery-inhibited pattern and a correction value for background copy-forgery-inhibited pattern at the same coordinates as the coordinates for correction value calculation is performed on the thumbnail value of a block header for correction value calculation.

Here, taking a specific example, the processing of Step 1004 to Step 1006 is described. Here, assume that a correction value corresponding to the latent image ID of 14 and the background ID of 1 is determined in Step 1003, and that (block coordinate X, block coordinate Y)=(500, 260) is determined in Step 1004 as the coordinates for correction value calculation. Furthermore, assume that the thumbnail values are (thumbnail_value_0, thumbnail_value_1, thumbnail_value_2)=(120, 0, 0).

In the correction value table for latent-image copy-forgery-inhibited pattern of FIG. 9A, in a case where the latent image ID is 14, (block coordinate X, block coordinate Y)=(500, 260) is obtained when one of the correction values for latent-image copy-forgery-inhibited pattern is n=2, m=2. Accordingly, in the determination processing of Step 1005, it will be determined that there are the same coordinates as the coordinates for correction value calculation. In contrast, in the correction value table for background copy-forgery-inhibited pattern of FIG. 9B, in a case where the background ID is 1, in the determination processing of Step 1005, it will not be determined that there are the same coordinates as the coordinates for correction value calculation.

As a result, in Step 1006, (Y, U, V)=(28, 100, 160), which is a correction value for latent-image copy-forgery-inhibited pattern at the same coordinates as the coordinates for correction value calculation, is used as a correction value for the thumbnail value of the block header for correction value calculation, and then the correction value calculation will be executed. Note that, as the correction value calculation executed here, a well-known approach, such as a replacement operation or an averaging operation, may be applied. For example, in a case where the averaging operation for calculating an average value between the respective components is applied, a correction result of (Y, U, V)=(74, 50, 80) will be obtained.

In this manner, after executing the correction value calculation processing on the thumbnail values of all the block image headers, the color/monochrome determination processing in Step 806 to Step 809 to be described later is executed, for example. Although the detail will be described later, suppose that the threshold values used in the color/monochrome determination are Th_u=3 and Th_v=3. In a case of the specific example described above, without the correction value calculation the thumbnail value becomes (120, 0, 0), and therefore in a case where the thumbnail value remains as is, the result of the color/monochrome determination should have been a monochrome block. However, because the thumbnail value is corrected to (74, 50, 80) by the correction value calculation, it will be determined as a color block.

In this manner, for each block coordinate at which a copy-forgery-inhibited pattern image is added, the correction value calculation is executed taking into consideration the thumbnail value of an original image and the content of a copy-forgery-inhibited pattern image, and therefore more precise color/monochrome determination processing is possible.

Now, back to the description of the flow chart of FIG. 10.

In Step 1007, the control unit 103 sets a color image flag in accordance with the content of a copy-forgery-inhibited pattern image to be added. Specifically, with reference to copy-forgery-inhibited pattern image user-setting data, based on the latent image ID and the background ID in the copy-forgery-inhibited pattern image to be added, the value of the color image flag is set to "0" indicative of a full color image or to "1" indicative of a full area color image. Here, a full color image means a color image corresponding to full color image charging to be described later, and a full area color image means a color image corresponding to full area color image charging to be described later. Whether the color image flag is set to 0 or 1 is determined, for example, with reference to a color image flag determination table prepared in advance. FIG. 11 shows an example of the color image flag determination table. Now that the latent image ID corresponding to a copy-forgery-inhibited pattern image to be added is "3" and the background ID is "2", the color image flag is determined, from the color image flag determination table of FIG. 11, as "1" indicative of a full area color image.

The above is the content of the correction value calculation processing.

Now, back to the description of the flow chart of FIG. 8.

In Step 805, the control unit 103 determines whether or not the above-described mono-colorization flag is ON. In a case where it is determined that the mono-colorization flag is OFF, the flow proceeds to Step 806. On the other hand, in a case where it is determined that the mono-colorization flag is ON, the flow proceeds to Step 807.

In Step 806, based on the thumbnail value of the block header, for each block, the control unit 103 executes the color/monochrome determination processing without taking into consideration the mono-colorization. This color/monochrome determination processing is performed by the comparison of the absolute value of each color component with a threshold value. Note that, a formula used in the comparison differs depending on the color space of a block and therefore a formula used in the comparison is determined with reference to the above-described "color space" of a block header prior to starting the processing.

(In Case where Color Space is YUV)

In a case where the color space is YUV, Formula (3) and Formula (4) below are used.

$$|U|<Th\_u \quad \text{Formula (3)}$$

$$|V|<Th\_v \quad \text{Formula (4)}$$

Here, Th_u is the threshold value of a U component and Th_v is the threshold value of a V component. For example, the threshold values, such as Th_u=3 and Th_v=3, are used. In a case where the results of the comparison in Formula (3) and Formula (4) above are both "TRUE", the relevant block is determined as a monochrome block. On the other hand, in a case where both or either of the results of the comparison are "FALSE", the relevant block is determined as a color block.

(In Case where Color Space is RGB)

In a case where the color space is RGB, Formula (5) and Formula (6) below are used.

$$|-0.169R-0.331G+0.500B|<Th\_u \quad \text{Formula (5)}$$

$$|500R-0.419G-0.081B|<Th\_v \quad \text{Formula (6)}$$

As with Formula (3) and Formula (4), Th_u is the threshold value of a U component and Th_v is the threshold value of a V component. In a case where the results of the comparison in Formula (5) and Formula (6) above are both "TRUE", the relevant block is determined as a monochrome block. On the other hand, in a case where both or either of the results of the comparison is "FALSE", the relevant block is determined as a color block.

(In Case where Color Space is CMYK)

In a case where the color space is CMYK, Formula (7), Formula (8), and Formula (9) below are used.

$$|C-M|<Th\_cm \quad \text{Formula (7)}$$

$$|C-Y|<Th\_cy \quad \text{Formula (8)}$$

$$|M-Y|<Th\_my \quad \text{Formula (9)}$$

Here, Th_cm is the threshold value of a difference between a C component and an M component, Th_cy is the threshold value of a difference between a C component and a Y component, and Th_my is the threshold value of a difference between an M component and a Y component. For example, threshold values, such as Th_cm=2, Th_cy=3, and Th_my=2, are used. In a case where all the results of the comparison in Formula (7) to Formula (9) above are "TRUE", the relevant block is determined as a monochrome block. On the other hand, in a case where the result of the comparison is "FALSE" in at least one formula among Formula (7) to Formula (9), the relevant block is determined as a color block.

In Step 807, in a case where a block subjected to the color/monochrome determination processing in Step 806 is a color block, the flow proceeds to Step 808. On the other hand, in a case where it is a monochrome block, the flow proceeds to Step 809.

In Step 808, the control unit 103 increments the color block count value.

In Step 809, the control unit 103 determines whether or not there is any unprocessed block. In a case where there is an unprocessed block, the flow returns to Step 806. On the other hand, in a case where the color/monochrome determination processing is complete for all the blocks, this processing is finished.

Here, what should be noticed is a difference between an accuracy of the color/monochrome determination in the setting processing (Step 1007) of the color image flag in the correction value calculation processing described above and an accuracy of the color/monochrome determination (Step 806) using the corrected thumbnail value.

The processing executed in Step 1007 described above is the determination based only on the content of a copy-forgery-inhibited pattern image, and is performed without consideration of the content of the original image. Accordingly, for example, in a case where a copy-forgery-inhibited pattern image including a latent-image copy-forgery-inhibited pattern and a background copy-forgery-inhibited pattern corresponding to latent image ID=14 and background ID=1 is added, it will be uniquely determined, from the color image flag determination table of FIG. 11, as a full color image regardless of the content of the original image.

In contrast, in the color/monochrome determination executed in Step 806, the thumbnail value is corrected depending on the content of the original image as described above, and therefore the determination result for each block will vary. That is, depending on the correction value calculation processing executed in Step 1003 to Step 1006 described above, the determination will vary, such as determined as a full color image or determined as a full area color image, and thus more precise color/monochrome determination will be performed.

In Step 810, based on a thumbnail value of the block header, for each block, the control unit 103 executes the color/monochrome determination processing taking into consideration the mono-colorization. Specifically, the color/monochrome determination processing is performed so that a white block (a block in which all the values of CMYK are zero) is determined as a monochrome block and the other blocks are determined as color blocks. As with Step 806, a formula used in the comparison differs depending on the color space of a block, and therefore a formula used in the comparison is determined with reference to the above-described "color space" of a block header prior to starting the processing.

(In Case where Color Space is YUV)

In a case where the color space is YUV, Formula (10) below is used.

$$|Y| < Th\_l \quad \text{Formula (10)}$$

Here, Th_l is the threshold value of a luminance component. For example, the threshold value of Th_l=2 is used. In a case where the result of the comparison in Formula (10) above is "TRUE", the relevant block will be determined as a monochrome block. On the other hand, in a case where the result of the comparison is "FALSE", the relevant block will be determined as a color block.

(In Case where Color Space is RGB)

In a case where the color space is RGB, Formula (11) below is used.

$$0.299R + 0.587G + 0.114B < Th\_l \quad \text{Formula (11)}$$

As with Formula (10), Th_l is the threshold value of a luminance component. In a case where the result of the comparison in Formula (11) above is "TRUE", the relevant block will be determined as a monochrome block. On the other hand, in a case where the result of the comparison is "FALSE", the relevant block will be determined as a color block.

(In Case where Color Space is CMYK)

In a case where the color space is CMYK, Formula (12) to Formula (15) below are used.

$$C < Th\_cw \quad \text{Formula (12)}$$

$$M < Th\_mw \quad \text{Formula (13)}$$

$$Y < Th\_yw \quad \text{Formula (14)}$$

$$K < Th\_kw \quad \text{Formula (15)}$$

Here, Th_cw, Th_mw, Th_yw, and Th_kw are the threshold values for respective color components. For example, the threshold values of Th_cw=Th_mw=Th_yw=Th_kw=2 are used. In a case where all the results of the comparison in Formula (12) to Formula (15) above are "TRUE", the relevant block will be determined as a monochrome block. On the other hand, in a case where the result of the comparison is "FALSE" in at least one formula among Formula (12) to Formula (14), the relevant block is determined as a color block.

Step 811 to Step 813 are the same as Step 807 to Step 809 described above and therefore the description thereof is omitted.

The above is the content of the color/monochrome determination processing in Step 208.

Now, back to the description of the flow chart of FIG. 2.

In Step 209, the control unit 103 performs the charging class determination processing on image data, based on the color/monochrome determination processing result in Step 208.

Figure 12:
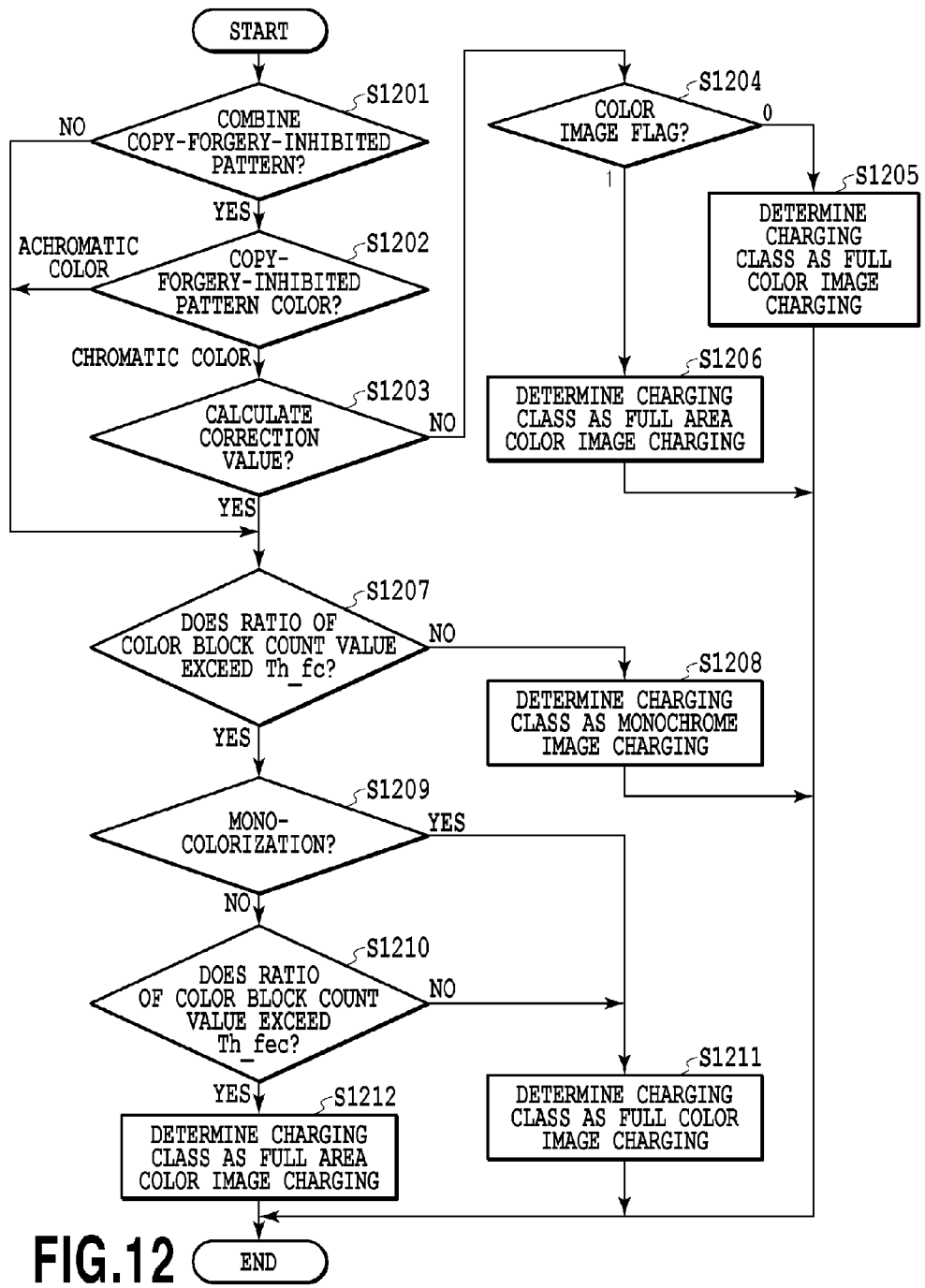
FIG. 12 is a flow chart showing a detail of charging class determination processing.

FIG. 12 is a flow chart showing a detail of the charging class determination processing.

In Step 1201, the control unit 103 determines whether or not to combine a copy-forgery-inhibited pattern image (specifically, whether or not the copy-forgery-inhibited pattern image synthesis flag described above is ON). In a case where it is determined that the copy-forgery-inhibited pattern image synthesis flag is ON, the flow proceeds to Step 1202. On the other hand, in a case where it is determined that the copy-forgery-inhibited pattern image synthesis flag is OFF, the flow proceeds to Step 1207.

In Step 1202, the control unit 103 reads copy-forgery-inhibited pattern image user-setting data from the RAM, and refers to the same and determines whether the copy-forgery-inhibited pattern color is an achromatic color or a chromatic color. In a case where it is determined that the copy-forgery-inhibited pattern color is a chromatic color, the flow proceeds to Step 1203. On the other hand, in a case where it is determined that the copy-forgery-inhibited pattern color is an achromatic color, the flow proceeds to Step 1207.

In Step 1203, the control unit 103 determines whether or not the calculation of a correction value has been executed in the above-described correction value calculation processing (Step 804). Specifically, as with Step 1003 described above, it is determined in accordance with the correction value calculation determination flag. In a case where the calculation of a correction value has been already executed, the flow proceeds to Step 1204. On the other hand, in a case where the calculation of a correction value has not been executed yet, the flow proceeds to Step 1207.

In Step 1204, the control unit 103 reads the value of the color image flag set in Step 1007 in the above-described correction value calculation processing, and determines whether the set value is "0 (a full color image)" or "1 (a full area color image)". In a case where the set value of the color image flag is "0", the flow proceeds to Step 1205. On the other hand, in a case where the set value of the color image flag is "1", the flow proceeds to Step 1206.

Figure 13:
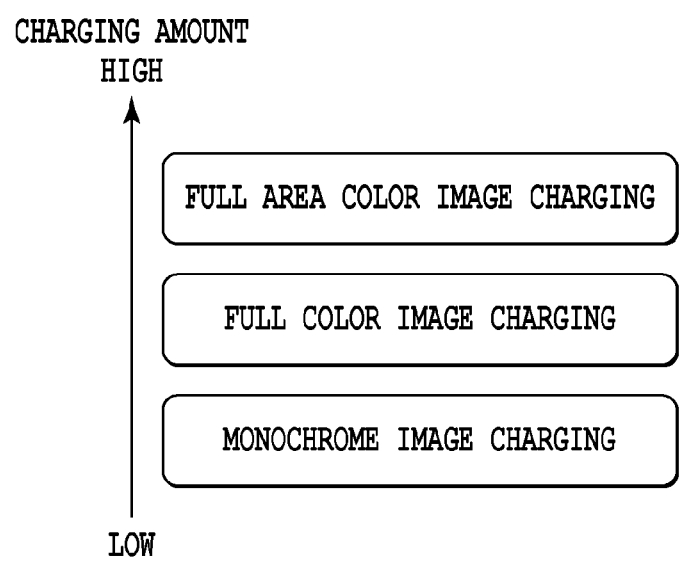
FIG. 13 is a view showing an example of charging classes.

In Step 1205, the control unit 103 determines the charging class with respect to the image data as the full color image charging. Here, the charging class is described. The charging class refers to information obtained by ranking an amount, which serves as a reference in calculating the printing fee of an image to be printed, in accordance with the types of printing. FIG. 13 is a view showing an example of the charging class, and in the present embodiment, there are full area color image charging, full color image charging, and monochrome image charging in the order from the highest price.

In Step 1206, the control unit 103 determines the charging class with respect to the image data as the full area color image charging of the highest charging amount.

In Step 1207, the control unit 103 determines whether or not the ratio of a color block count value relative to a total number of blocks generated from image data exceeds a predetermined threshold value (a full color threshold value) Th_fc. In a case where it is determined that the ratio of a color block count value exceeds Th_fc, the flow proceeds to Step 1209. On the other hand, in a case where it is determined that the ratio of a color block count value does not exceed Th_fc, the flow proceeds to Step 1208.

In Step 1208, the control unit 103 determines the charging class with respect to the image data as the monochrome image charging of the lowest charging amount.

In Step 1209, the control unit 103 determines whether or not the mono-colorization is specified (specifically, whether or not the above-described mono-colorization flag is ON). In a case where it is determined that the mono-colorization flag is OFF, the flow proceeds to Step 1210. On the other hand, in a case where it is determined that the mono-colorization flag is ON, the flow proceeds to Step 1211.

In Step 1210, the control unit 103 determines whether or not the ratio of a color block count value relative to a total number of blocks generated from image data exceeds a predetermined threshold value (a full area color threshold value) Th_fec. In a case where it is determined that the ratio of a color block count value exceeds Th_fec, the flow proceeds to Step 1212. On the other hand, in a case where it is determined that the ratio of a color block count value does not exceed Th_fec, the flow proceeds to Step 1211.

In Step 1211, the control unit 103 determines the charging class with respect to the image data as the full color image charging.

In Step 1212, the control unit 103 determines the charging class with respect to the image data as the full area color image charging.

Here, how the charging class determination processing relating to the present embodiment is performed is described by taking a specific example.

Figure 14:
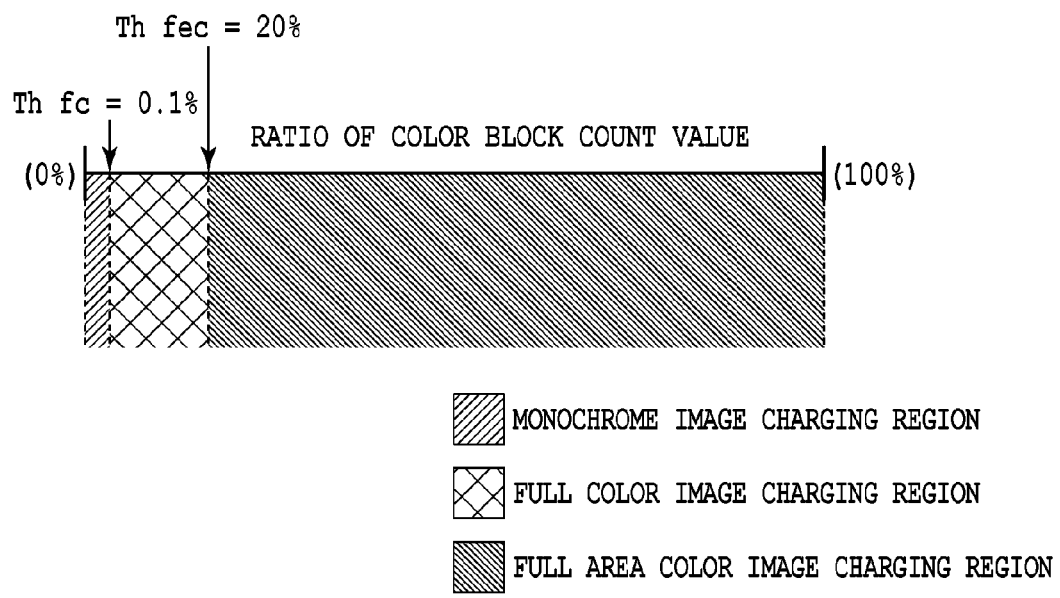
FIG. 14 is a view showing how a charging class is divided into three classes, i.e., a monochrome image charging class, a full color image charging class, and a full area color image charging class.

As a premise, assume that the image data to be printed is for full color and that a setting for not executing the copy-forgery-inhibited pattern image synthesis processing is already made. The determination in Step 1201 results in No, and it is determined whether or not the ratio of a color block count value relative to a total number of blocks generated from image data exceeds the full color threshold value Th_fc (Step 1207). Here, in a case where the resolution of image data is 600 dpi, the size is A4, and the image data is divided by a block of eight-pixel square, a total number of blocks is approximately 546,000. Then, assume that 50,000 blocks out of 546,000 blocks are determined as color blocks, then the ratio of the color block count value relative to a total number of blocks is approximately 9.2%. Here, assume that the full color threshold value Th_fc is 0.1% and the full area color threshold value Th_fec is 20%. FIG. 14 shows how the monochrome image charging, the full color image charging, and the full area color image charging are classified according to the full color threshold value Th_fc and the full area color threshold value Th_fec. Because the ratio, approximately 9.2%, of the color block count value relative to a total number of blocks is higher than the full color threshold value Th_fc of 0.1%, the result of the determination in Step 1207 is Yes. Then, because the image data is for full color, in Step 1209, it is determined as No. Then, because the ratio, approximately 9.2%, of the color block count value relative to a total number of blocks is lower than the full color area threshold value Th_fec of 20% (No in Step 1210), as a result the charging class will be determined as the full color image charging (Step 1211).

The above is the content of the charging class determination processing in Step 209. Then, in accordance with the charging class obtained in this manner, the printing fee of a printed material will be calculated.

Note that, in the present embodiment, with regard to the addition of an image in the output-image processing unit, a case has been described, where correction corresponding to the copy-forgery-inhibited pattern image synthesis processing is performed, taking as an example a case of adding a copy-forgery-inhibited pattern image. However, an image to be added is not limited to a copy-forgery-inhibited pattern image, and may be a stamp image, in which a character, for example such as "CONFIDENTIAL", is stamped. In this case, in the correction value calculation processing, the calculation of a correction value will be performed in accordance with a correction value table that is prepared depending on a stamp image to be added.

According to the present embodiment, the charging determination can be performed taking into consideration the influences due to the monochromating processing, the mono-colorization processing, and the copy-forgery-inhibited pattern image synthesis processing executed in the output-image processing. Thus, even in a case where the charging determination is performed at the preceding stage of the output-image processing, charging determination consistent with the print result can be realized.

OTHER EMBODIMENTS

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-275792, filed Dec. 18, 2012, which is hereby incorporated by reference herein in its entirety.

What is claimed is:

1. A device comprising:
    a unit configured to divide an image into blocks of a predetermined size;
    a calculation unit configured to calculate color value of each of the blocks by using color values of pixels included in each of the blocks;
    a unit configured to determine whether an additional image is combined with each of the blocks;
    a correction value calculation unit configured to correct the calculated color value of each of the blocks by using a correction value corresponding to the additional image in a case where the additional image is determined to be combined with the each of the blocks; and
    a color/monochrome determination processing unit configured to determine whether a block of interest is a color block or a monochrome block based on the calculated color value of the block of interest in a case where the additional image is determined to be combined with the block of interest, and determine whether a block of interest is a color block or a monochrome block based on the corrected color value of the block of interest in a case where the additional image is determined to be combined with the block of interest.

2. The device according to claim 1, wherein the correction value corresponding to the additional image is determined with reference to a correction value table for storing a correction value associated with a content of each additional image.

3. The device according to claim 1,
    wherein the color/monochrome determination processing unit performs the determination by comparing an absolute value of the color component with a predetermined threshold value, and
    wherein a formula used in the comparison differs depending on whether the output image is printed in full color or in mono color.

4. The device according to claim 1, wherein the additional image is a copy-forgery-inhibited pattern image or a stamp image.

5. The device according to claim 1, wherein the correction value calculation unit does not perform correction using the correction value in a case where the additional image is an achromatic color.

6. The device according to claim 1, further comprising a charging class determination unit configured to determine, based on a result of determination in the color/monochrome determination unit, a charging class for calculating a printing fee of the image to be printed.

7. The device according to claim 6, wherein the charging class determination unit counts a number of blocks that are determined as a color block by the color/monochrome determination processing unit, and compares a counted value with a predetermined threshold value, thereby determining the charging class.

8. The device according to claim 6, further comprising a setting unit configured to set in advance whether or not to perform correction by the correction value calculation unit, wherein in a case where a setting for not performing correction is made by the setting unit,
    the color/monochrome determination processing unit does not determine, based on the corrected average value, whether the block is a color block or a monochrome block, and
    the charging class determination unit determines a charging class based only on a content of the additional image.

9. An image forming apparatus with the device according to claim 1, the image forming apparatus comprising a printing unit configured to print an image to be printed, with an additional image attached thereto.

10. A method comprising the steps of:
    dividing an image into blocks of a predetermined size;
    calculating color value of each of the blocks by using color values of pixels included in each of the blocks;
    determining whether an additional image is combined with each of the blocks;
    correcting the calculated color value of each of the blocks by using a correction value corresponding to the additional image in a case where the additional image is determined to be combined with the each of the blocks; and
    determining whether a block of interest is a color block or a monochrome block based on the calculated color value of the block of interest in a case where the additional image is determined to be combined with the block of interest, and determining whether a block of interest is a color block or a monochrome block based on the corrected color value of the block of interest in a case where the additional image is determined to be combined with the block of interest,
    wherein at least one of the dividing step, the calculating step, the correcting step, and the determining step are implemented by at least one processor executing instructions stored in a memory.

* * * * *